(12) United States Patent
Zhang et al.

(10) Patent No.: US 11,263,483 B2
(45) Date of Patent: Mar. 1, 2022

(54) METHOD AND APPARATUS FOR RECOGNIZING IMAGE AND STORAGE MEDIUM

(71) Applicant: BEIJING DAJIA INTERNET INFORMATION TECHNOLOGY CO., LTD., Beijing (CN)

(72) Inventors: Zhiwei Zhang, Beijing (CN); Yan Li, Beijing (CN); Lijun Wu, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 27 days.

(21) Appl. No.: 16/887,172

(22) Filed: May 29, 2020

(65) Prior Publication Data

US 2020/0293824 A1 Sep. 17, 2020

(30) Foreign Application Priority Data

May 29, 2019 (CN) .......................... 201910458493.6

(51) Int. Cl.
*G06K 9/62* (2006.01)
*G06N 3/08* (2006.01)
(52) U.S. Cl.
CPC ............. *G06K 9/6256* (2013.01); *G06N 3/08* (2013.01)
(58) Field of Classification Search
CPC ...... G06N 20/00; G06N 3/084; G06N 3/0454; G06N 7/005; G06N 20/20; G06N 5/003; G06N 3/04; G06N 3/08; G06K 2209/05; G06K 9/4604; G06K 9/6271; G06K 9/6256; G06K 9/6217; G06K 9/6267; G06K 9/628; G06K 9/00147; G06K 9/6257; G06K 9/6259; G06K 9/6262

USPC ......................................................... 382/155
See application file for complete search history.

(56) References Cited

U.S. PATENT DOCUMENTS

2018/0307946 A1* 10/2018 Kuroda ................ G06K 9/6259
2019/0384047 A1* 12/2019 Johnson .............. G06K 9/0014

FOREIGN PATENT DOCUMENTS

| CN | 108959304 A | 12/2013 |
|---|---|---|
| CN | 104881689 A | 9/2015 |
| CN | 106651937 A | 5/2017 |
| CN | 107251011 A | 10/2017 |
| CN | 108197320 A | 6/2018 |
| CN | 108446695 A | 8/2018 |
| CN | 108764281 A | 11/2018 |
| CN | 108898166 A | 11/2018 |

(Continued)

OTHER PUBLICATIONS

Research on Semantic Retrieval of Socialized Tags (2013).

*Primary Examiner* — Ajibola A Akinyemi
(74) *Attorney, Agent, or Firm* — Meunier Carlin & Curfman LLC

(57) ABSTRACT

A method and apparatus for recognizing an image, and a storage medium are provided. The method includes: obtaining labeling results of training data to be labeled in a target training data set; determining a weight coefficient of each labeling result in response to that the training data includes a plurality of labeling results; determining a label of the training data based on labeling result and the weight coefficient corresponding to the labeling result, wherein the training data with the label is the target training data for training a recognition model; and recognizing the image based on the recognition model trained based on the target training data.

12 Claims, 3 Drawing Sheets

(56) References Cited

FOREIGN PATENT DOCUMENTS

| CN | 109034205 A | 12/2018 |
|----|-------------|---------|
| CN | 109389220 A | 2/2019  |

\* cited by examiner

METHOD AND APPARATUS FOR RECOGNIZING IMAGE AND STORAGE MEDIUM

CROSS-REFERENCES TO RELATED APPLICATION

This application claims priority to Chinese patent application No. 201910458493.6 filed on May 29, 2019, which is incorporated herein by reference in its entirety.

FIELD

The present disclosure relates to the field of artificial intelligence, and in particular relates to a method and apparatus for recognizing image, and a storage medium.

BACKGROUND

Deep learning is widely applied in fields related to video images, voice recognition, natural language processing and the like. With a convolution neural network (CNN) as an example, the accuracy of the machine recognition is greatly improved due to the super-strong fitting capability and end-to-end global optimization capability of the CNN. Using CNN model, the recognition accuracy of a machine learning model is significantly improved. However, one machine learning model meeting a recognition requirement depends on training data containing labels. In the related art, the labels of the training data are obtained after being artificially labeled. However, due to influences from the subjective thinking of a person, the training data to be labeled may generate various labeling results when being artificially labeled.

In the related art, for the training data to be labeled containing the plurality of labeling results, the labeling result with the maximum occurrence times is used as a label of the training data. Such a way of inflexibly acquiring the label of the training data to be labeled affects the accuracy of a recognition result of a recognition model obtained by training by virtue of the training data and further affects the reference and credibility of the recognition result.

SUMMARY

According to a first aspect of an embodiment of the present disclosure, a method for recognizing an image is provided. The method includes: obtaining labeling results of training data to be labeled in a target training data set; determining a weight coefficient of each labeling result in response to that the training data includes a plurality of labeling results; determining a label of the training data based on labeling result and the weight coefficient corresponding to the labeling result, wherein the training data with the label is the target training data for training a recognition model; and recognizing the image based on the recognition model trained based on the target training data.

In some embodiments, said obtaining the labeling results of the training data to be labeled in the target training data set includes: obtaining initial labeling results of the training data to be labeled in the target training data set; determining whether the initial labeling results satisfy a labeling condition; and determining the labeling results in response to that the initial labeling result satisfies the labeling condition.

In some embodiments, said determining the weight coefficient of each labeling result includes: obtaining occurrence times of each labeling result and occurrence times of all the labeling results respectively; and determining the weight coefficient based on a ratio of the occurrence times of each labeling result to the occurrence times of all the labeling results.

In some embodiments, the method further includes: determining a loss function of the recognition model, wherein the loss function is configured to determine a convergence degree of the recognition model trained based on the target training data.

In some embodiments, the loss function includes relative entropy function; the loss of the loss function is determined based on the target training data, a prediction probability of that the recognition model recognize the target training data as a recognition result and the weight coefficient of the labeling result.

According to a second aspect of the embodiment of the present disclosure, an apparatus for recognizing an image is provided. The apparatus includes: a processor; and a memory configured to store an instruction executable by the processor, wherein the processor is configured to execute the instruction to: obtain labeling results of training data to be labeled in a target training data set; determine a weight coefficient of each labeling result in response to that the training data includes a plurality of labeling results; determine a label of the training data based on labeling result and the weight coefficient corresponding to the labeling result, wherein the training data with the label is the target training data for training a recognition model; and recognize the image based on the recognition model trained based on the target training data.

In some embodiments, the processor is configured to obtain initial labeling results of the training data to be labeled in the target training data set; determine whether the initial labeling results satisfy a labeling condition; and determine the labeling results in response to that the initial labeling result satisfies the labeling condition.

In some embodiments, the processor is configured to obtain occurrence times of each labeling result and occurrence times of all the labeling results respectively, and determine the weight coefficient based on a ratio of the occurrence times of each labeling result to the occurrence times of all the labeling results.

In some embodiments, the processor is further configured to determine a loss function of the recognition model, wherein the loss function is configured to determine a convergence degree of the recognition model trained based on the target training data.

In some embodiments, the loss function includes relative entropy function; the loss of the loss function is determined based on the target training data, a prediction probability of that the recognition model recognize the target training data as a recognition result and the weight coefficient of the labeling result.

According to a third aspect of the embodiment of the present disclosure, a computer readable storage medium is provided. The computer readable storage medium includes an instruction that, when executed by a processor of an electronic device, cause the electronic device to perform the method in the first aspect or any one embodiment of the first aspect.

According to a fourth aspect of the embodiment of the present disclosure, a computer program (product) is provided. The computer program (product) includes: a computer program code that, when executed by a computer, cause the computer to perform the method in each of the above aspects.

It should be understood that the above general description and the following detailed description are merely exemplary and explanatory, rather than to limit the present disclosure.

BRIEF DESCRIPTION OF THE DRAWINGS

Accompanying drawings described herein are incorporated into the specification, construct a part of the specification, show embodiments conforming to this application and explain the principle of this application together with the specification.

DETAILED DESCRIPTION

In order to ensure that technical solutions of the present disclosure are better understood by the ordinary skilled in the art, the technical solutions in the embodiments of the present disclosure are described clearly and completely below with reference to the drawings.

It should be noted that terms "first", "second" and the like used in the specification and claims of the present disclosure and the above accompanying drawings are not used to describe a specific order or precedence order, but are merely used to distinguish similar objects. It should be understood that data used in such a way can be interchanged in an appropriate case so that the embodiments of the present disclosure described herein can be executed in an order except those illustrated or described herein. Implementation ways described in the following embodiments do not represent for all implementation ways consistent with the present disclosure. On the contrary, they are merely examples of an apparatus and method which are described in appended claims and consistent with some aspects of the present disclosure.

The present disclosure provides a method and apparatus for recognizing an image, and a storage medium, which can determine a label of training data based on labeling result and weight coefficient corresponding to the labeling result, thus improving the accuracy of a recognition result of a recognition model trained based on the training data and further improves the reference and credibility of the recognition result.

Figure 1:
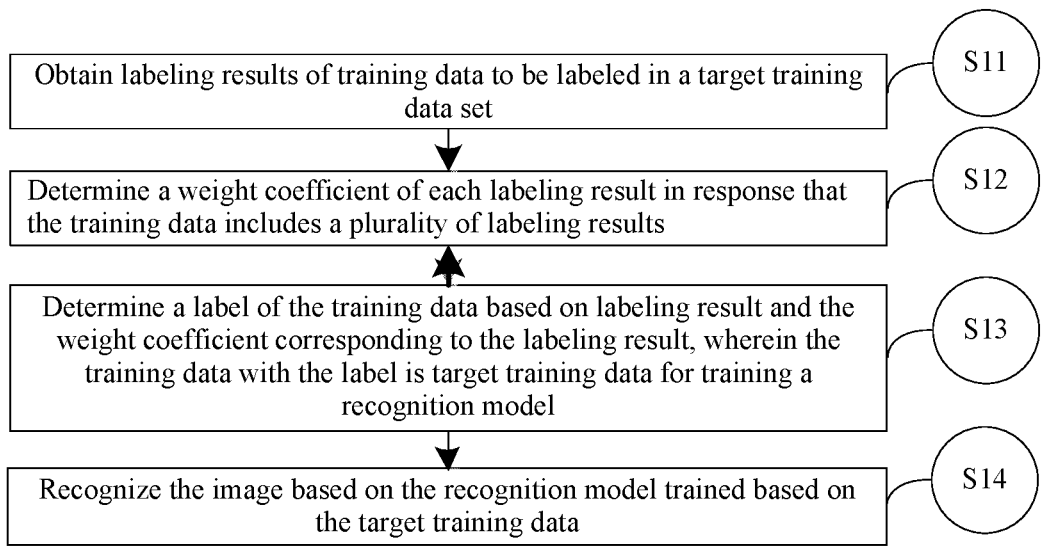
FIG. 1 is a flow diagram of a method for recognizing an image in accordance with an embodiment.

FIG. 1 is a flow diagram of a method for recognizing an image according to an embodiment. The method is applied in a computer device such as a terminal or a server, and the terminal is described in the embodiment of this application. As shown in FIG. 1, the method includes the following steps.

In S11, labeling results of training data to be labeled in a target training data set are obtained.

In some embodiments, the labeling result of the training data to be labeled may be obtained in a way that: when a terminal where the training data to be labeled is located receives a labeling operation signal, a data transmission program of the terminal is triggered to transmit the received labeled data to the terminal, so that the terminal takes the labeled data obtained in real time as the labeling result of the training data to be labeled.

In some embodiments, a plurality of labeling regions are set on the terminal, for any one of the training data to be labeled, when the terminal receives a signal that the labeling of the labeling data of all the labeling regions is completed, a data transmission program of the terminal is triggered to transmit the labeled data to the terminal, so that the terminal takes the labeled data obtained in real time as the labeling result of the training data to be labeled. The way of obtaining the labeling result is not limited in the embodiment of this application.

In some embodiments, said obtaining labeling results of training data to be labeled in the target training data set includes: obtaining initial labeling results of the training data to be labeled in the target training data set; determining whether the initial labeling results satisfy a labeling condition; and determining the labeling results in response to that the initial labeling result satisfies the labeling condition.

In some embodiments, the initial labeling results of the training data to be labeled are obtained, and the initial labeling results with obvious labeling errors may be removed firstly, and then, the final labeling results satisfy the labeling condition may be determined. For example, when one of the training data to be labeled is a landscape picture, when the beautiful degree of the landscape picture is required to be labeled, the possible labeling results are "beautiful", "ordinary" and "not beautiful", if one of the obtained labeling results is "delicious", it is apparent that the labeling result is a wrong labeling result, the wrong labeling result is a labeling result which does not satisfy the labeling condition, and therefore, three initial labeling results are obtained. For example, when it is specified in the terminal that the initial labeling results of the training data to be labeled in a certain target training data set are denoted in a digital form, if one of the training data to be labeled is a landscape picture, when the beautiful degree of the landscape picture is required to be labeled, possible initial labeling results are "beautiful", "ordinary" and "not beautiful", then it is specified in the terminal that the number represents the labeling result, for example, "0" represents for "beautiful", the number "1" represents for "ordinary", the number "2" represents for "not beautiful", and then, if the labeling data received by the terminal are other number, it is apparent that the labeling result is a wrong labeling result. Therefore, the wrong initial labeling result is removed, and the labeling results satisfying the labeling condition are determined as the labeling results of the training data.

In S12, a weight coefficient of each labeling result is obtained in response to that the training data includes a plurality of labeling results.

Figure 2:
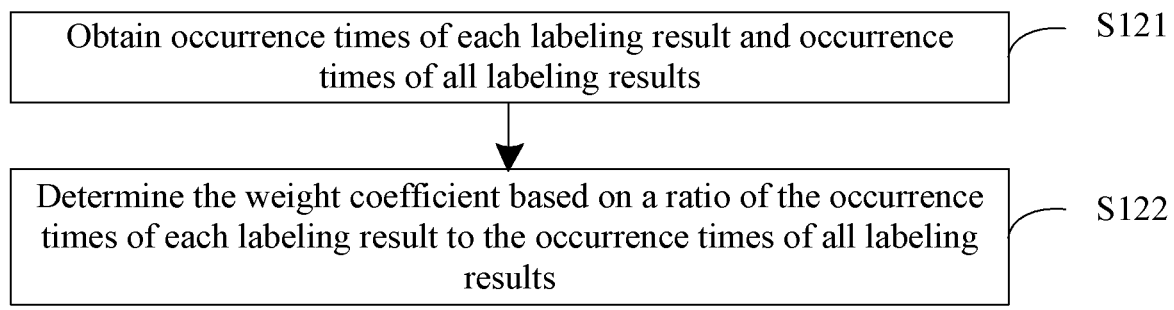
FIG. 2 is a flow diagram of a method for recognizing an image in accordance with an embodiment.

In some embodiments, as shown in FIG. 2, the step S12 includes step S121 and S122. In S121, occurrence times of each labeling result and occurrence times of all labeling results are obtained; and in S122, the weight coefficient is determined based on a ratio of the occurrence times of each labeling result to the occurrence times of all labeling results.

In some embodiments, for statistics on the occurrence times of each labeling result, labeled data may be transmitted to the terminal when the labeled data are detected in labeling regions of the terminal where the training data to be labeled are located, and the terminal determines the received labeled data as the labeling results, and the numbers of the different labeling results are respectively recorded, and furthermore, the occurrence times of each labeling result and the occurrence times of all labeling results are obtained. The weight coefficient of each labeling result is obtained according to the ratio of the occurrence times of each labeling result to the occurrence times of all the labeling results.

In S13, a label of the training data is determined based on the labeling result and the weight coefficient corresponding to the labeling result, wherein the training data with the label is the target training data for training a recognition model.

In some embodiments, the recognition model is used to recognize an image. The recognition model may be a machine learning model, deep learning model, etc., and can be trained by the training data. The recognition model is not limited to the above learning model in the embodiment of this application, and can be other learning model occurred to the skilled in the art.

In some embodiments, the label of the training data is a combination of the labeling result and the weight coefficient corresponding to the labeling result. If one of the training data to be labeled is a landscape picture sample, labeling results are defined for labeling the beautiful degree of the landscape picture, each labeling result corresponds to a weight coefficients. For example, the labeling results are "beautiful", "ordinary" and "not beautiful", accordingly the weight coefficients of all the labeling results are obtained, for example, the weight coefficients of the labeling results are 0.5, 0.4 and 0.1 respectively, and then the label may be a combination of labeling result and the weight coefficient, for example, sample (beautiful)=0.5; sample (ordinary)=0.4; and sample (not beautiful)=0.1. In some embodiments, the labeling results may also be denoted with numbers, for example, "0" represents for "beautiful", "1" represents for "ordinary", "2" represents for "not beautiful", and then the label may also be a combination of the number representing label resulting and weight coefficient. For, example, the label may be sample (0)=0.5; sample (1)=0.4; and sample (2)=0.1. If the beautiful degree of the landscape picture is recognized, generally a great number of landscape pictures are used as the training data, and therefore, meanings represented by different numbers may be specified to make the resulting label more concise. The way of the label is not limited in the embodiment of this application if only the final label may embody different labeling results and the weight coefficients corresponding to the labeling results.

In S14, the image is recognized based on the recognition model trained based on the target training data.

In the method for recognizing the image according to the embodiment of this application, the weight coefficient of each labeling result is determined in response to that the training data includes a plurality of labeling results, the label of the training data is determined based on labeling result and the weight coefficient corresponding to the labeling result, and thus the target training data for training the recognition model are obtained. The obtained label of the training data is not a fixed labeling result, but the plurality of obtained labeling results together with weight coefficients thereof corresponding to the labeling results are used as label contents, so that the accuracy of the recognition result of the recognition model as well as the reference and credibility of the recognition result are improved when recognizing image based on the recognition model trained based on the target training data.

Figure 3:
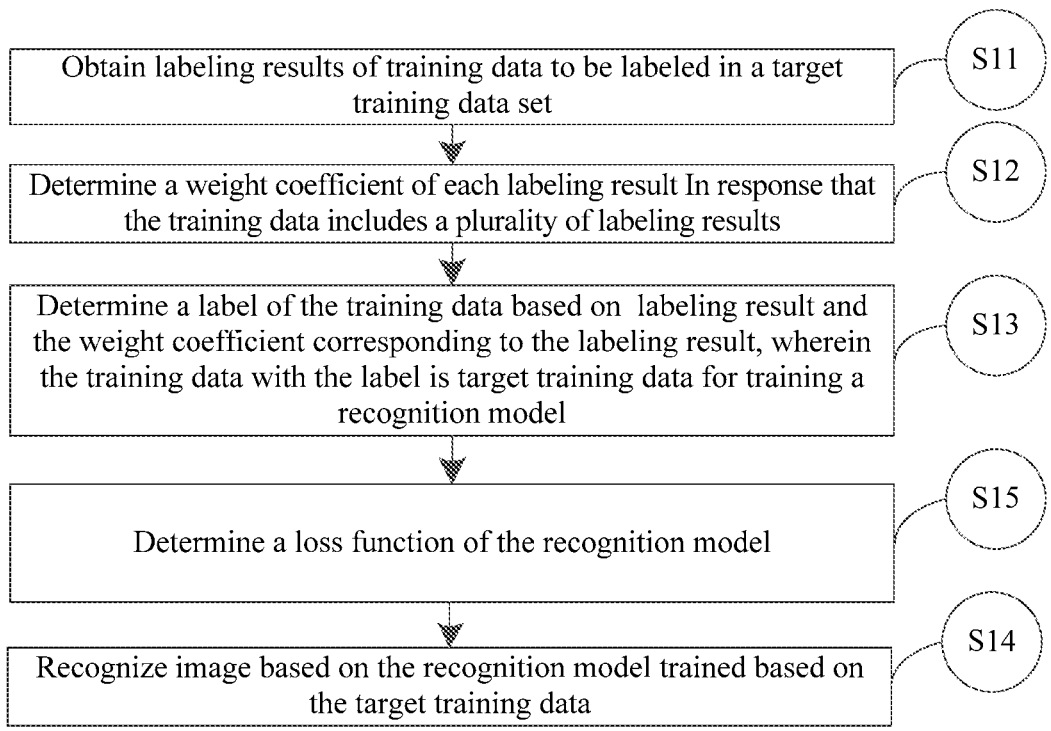
FIG. 3 is a flow diagram of a method for recognizing an image in accordance with an embodiment.

In some embodiments, the method further includes the step of determining a loss function of the recognition model. As shown in FIG. 3, in the step S15, a loss function of the recognition model is determined.

In some embodiments, the loss function may represent a difference between the result recognized based the recognition model and the actual value. The loss function may be a cross entropy loss function and a Euclidean distance. The loss function may be configured to determine the convergence degree of the recognition model trained based on the target training data. When the convergence degree satisfies a target condition, the recognition model corresponding to the current convergence degree is determined as a trained recognition model. The convergence degree may be determined in a way that it is determined based on a loss value of the loss function whether a loss value of the loss function within a target time fluctuates within a target range; when the loss value of the loss function within the target time fluctuates within the target range, it means that the training of the recognition model is ended, and the recognition model that satisfies a requirement is obtained. The target time and target range may be determined by the skilled in the art based on an actual demand and are not limited in the embodiment of this application.

In some embodiments, the loss function includes relative entropy function. The loss of the loss function is determined based on the target training data, a prediction probability of that the recognition model recognize the target training data as a recognition result and the weight coefficient of the labeling result.

In some embodiments, the relative entropy function is shown as the following formula (1):

$$\text{loss} = \frac{1}{M} \sum_{x \in X} \sum_{k \in N} P(x)^k * \log\left(\frac{P(x)^k}{Q(x)^k}\right). \quad (1)$$

wherein loss is a loss value of the relative entropy function; X is a target training set composed of the target training data; M is a number of batches into which the target training data are divided; x is any one of the target training data; N is a type set of the labeling results of any one of the target training data; k is any one of the labeling results in the type set of the labeling results; $P(x)^k$ is a prediction probability of that the recognition model trained based on the target training data recognizes the target training data as k; and $Q(x)^k$ is the weight coefficient of the labeling result k.

The loss function of the recognition model is set as the relative entropy function, and the convergence degree of the recognition model trained based on the target training data is determined according to the loss of the relative entropy function, so that the accuracy of the recognition model may be increased. The type of the loss function is not limited in the embodiment of this application, and the skilled in the art may also obtain the recognition model based on other loss functions.

Figure 4:
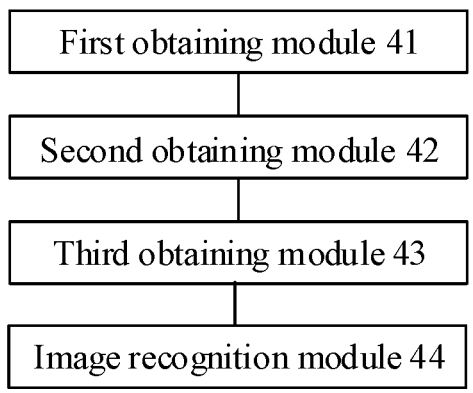
FIG. 4 is a block diagram of an apparatus for recognizing an image in accordance with an embodiment.

FIG. 4 is a block diagram of an apparatus for recognizing an image according to an embodiment. Referring to FIG. 4, the apparatus includes a first obtaining module 41, a second obtaining module 42, a third obtaining module 43 and an image recognition module 44.

The first obtaining module 41 is configured to obtain labeling results of training data to be labeled in the target training data set.

The second obtaining module 42 is configured to determine a weight coefficient of each labeling result in response to that the training data includes a plurality of labeling results.

The third obtaining module 43 is configured to determine a label of the training data based on labeling result and the weight coefficient corresponding to the labeling result, wherein the training data with the label is the target training data for training a recognition model.

The image recognition module 44 is configured to recognize the image based on the recognition model trained based on the target training data.

In the apparatus for recognizing the image according to the embodiment of this application, the weight coefficient of each labeling result is obtained in response to that the training data includes a plurality of labeling results, the label of the training data is determined based on labeling result and the weight coefficient corresponding to the labeling result, and thus the target training data for training the recognition model is obtained. The label of the training data is not the fixed labeling result, but the plurality of labeling results together with weights corresponding to the labeling results are used as the label contents, so that the accuracy of the recognition result of the recognition model as well as the reference and credibility of the recognition result are improved when recognizing the image based on the recognition model trained based on the target training data.

In some embodiments, the first obtaining module 41 is configured to obtain the initial labeling results of the training data to be labeled in the target training data set, determine whether the initial labeling results satisfy the labeling condition; and determine the labeling results in response to that the initial labeling result satisfies the labeling condition.

In some embodiments, the second obtaining module 42 is configured to obtain the occurrence times of each labeling result and the occurrence times of all labeling results during labeling respectively; and determine the weight coefficient based on the ratio of the occurrence times of each labeling result to the occurrence times of all labeling results.

In some embodiments, the third obtaining module 43 is further configured to determine a loss function of the recognition model, wherein the loss function is configured to determine a convergence degree of the recognition model trained based on the target training data.

In some embodiments, the loss function includes relative entropy function. The loss of the loss function is determined based on the target training data, a prediction probability of that the recognition model recognizes the target training data as a recognition result and the weight coefficient of the labeling result.

In some embodiments, the relative entropy function is shown as the following formula $$\text{loss} = \frac{1}{M} \sum_{x \in X} \sum_{k \in N} P(x)^k * \log\left(\frac{P(x)^k}{Q(x)^k}\right). \quad (1)$$

wherein loss is the loss value of the relative entropy function; X is the target training set composed of the target training data; M is the number of batches into which the target training data are divided; x is any one of the target training data; N is the type set of the labeling results of any one of the target training data; k is any one of the labeling results in the type set of the labeling results; $P(x)^k$ is a prediction probability of that the recognition model trained based on the target training data recognizes the target training data as k; and $Q(x)^k$ is the weight coefficient of the labeling result k.

For the apparatus in the above embodiment, a specific way that each of the modules performs an operation has been described in detail in the embodiments related to the method, and the detailed descriptions thereof are omitted herein.

Figure 5:
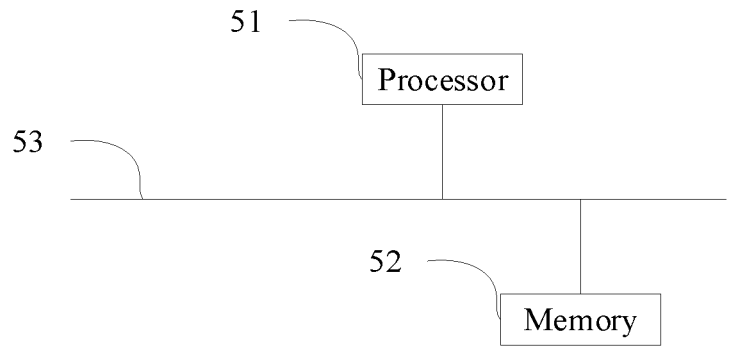
FIG. 5 is a block diagram of an electronic device in accordance with an embodiment.

Based on the same concept, an embodiment of this application further provides an electronic device, as shown in FIG. 5, the electronic device includes: one or more processors 51; and one or more memories 52 configured to store an instruction executable by the one or more processors 51, wherein the one or more processors 51 are configured to execute the image recognition method in the above embodiment. The processors 51 are connected with the memories 52 through a communication bus 53.

It should be understood that the process above may be a central processing unit (CPU) or any other general processor, a digital signal processing (DSP), an application specific integrated circuit (ASIC), a field-programmable gate array (FPGA) or any other programmable logic device, discrete gate or transistor logic device, discrete hardware component and the like. The general processor may be a microprocessor or any conventional processor and the like. It should be noted that the processor may support advanced RISC machines (ARM) architecture.

In some embodiments, the above memory may include a read-only memory and a random access memory and provides instructions and data to the processor. The memory may also include a non-volatile random access memory. For example, the memory may also store information of a device type.

The memory may be a volatile memory or a non-volatile memory or include both of the volatile memory and the non-volatile memory. The non-volatile memory may be a read-only memory (ROM), a programmable ROM (PROM), an erasable PROM (EPROM), an electrically EPROM (EEPROM) or a flash memory. The volatile memory may be a random access memory (RAM), which is used as an external high-speed cache. By way of an exemplary description instead of a restrictive description, the RAMs with a plurality of forms, such as a static RAM (SRAM), a dynamic random access memory (DRAM), a synchronous DRAM (SDRAM), a double data date SDRAM (DDR SDRAM), an enhanced SDRAM (ESDRAM), a synchlink DRAM (SLDRAM) and a direct rambus RAM (DR RAM), are available.

Figure 6:
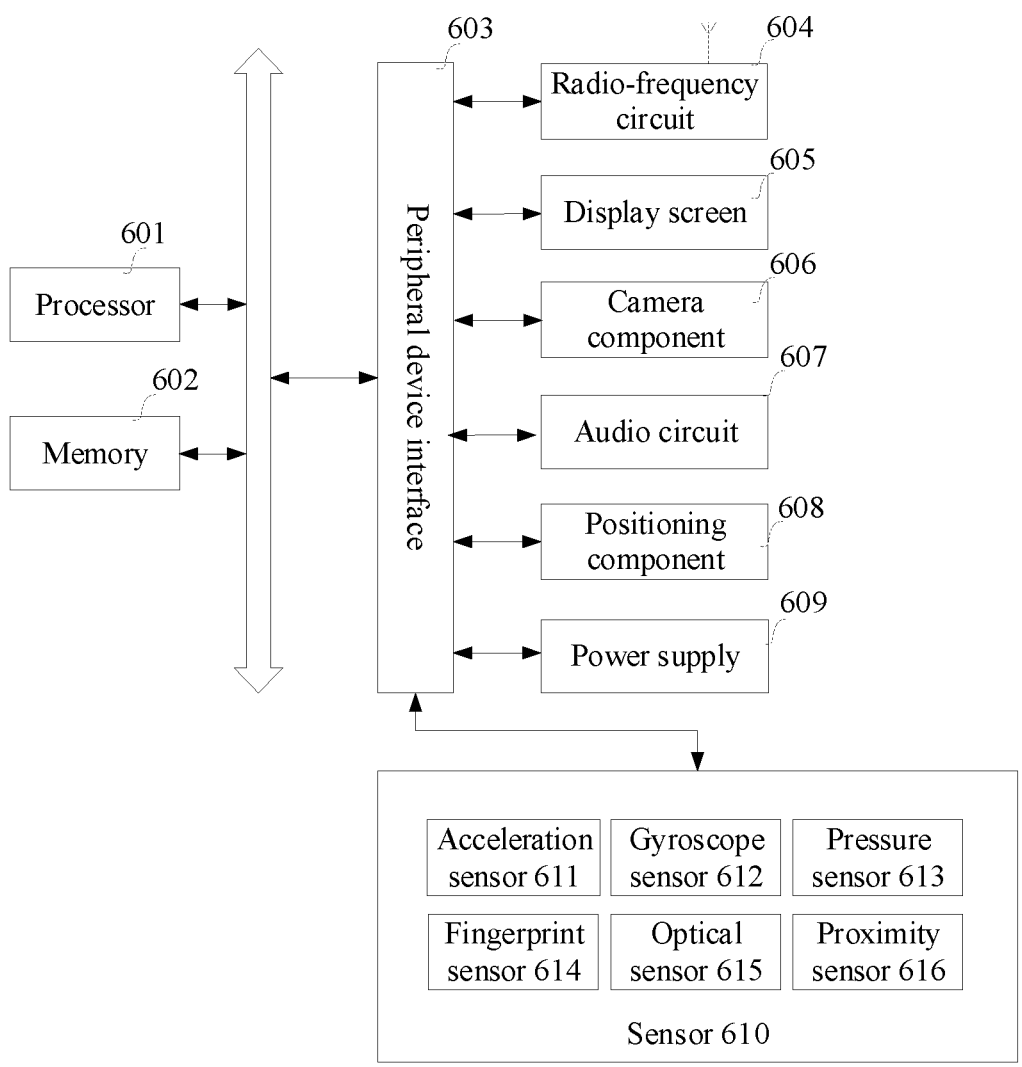
FIG. 6 is a schematic diagram of a terminal in accordance with an embodiment.

FIG. 6 is a block diagram of a terminal 600 according to an embodiment. The terminal 600 may be a smart phone, a tablet computer, a notebook computer or a desktop computer. The terminal 600 may also be known as a user device, a portable terminal, a laptop terminal, a desktop terminal or other names.

Generally, the terminal 600 includes a processor 601 and a memory 602.

The processor 601 may include one or more processing cores such as a four-core processor and an eight-core processor. The processor 601 may be implemented by adopting at least one hardware form in digital signal processing (DSP), a field-programmable gate array (FPGA) and a programmable logic array (PLA). The processor 601 may further include a host processor and a co-processor, the host processor is a processor for processing the data in a wake-up state and is also known as a central processing unit (CPU); and the co-processor is a low-power-consumption processor for processing the data in a standby state. In some embodiments, the processor 601 may be integrated with the GPU (Graphics Processing Unit), and the GPU is configured to render and draw a content required to be displayed by a display screen. In some embodiments, the processor 601 may further include an artificial intelligence (AI) processor which is configured to process a calculation operation related to machine learning.

The memory 602 may include one or more computer readable storage medium which may be non-transitory. The memory 602 may further include a high-speed random access memory and a non-volatile memory such as one or more disk storage devices and flash memory devices. In some embodiments, a non-transitory computer readable storage medium in the memory 602 is configured to store at least one instruction, and the at least one instruction is configured to be executed by the processor 601 to perform the image recognition method provided by the embodiment of the method in this application.

In some embodiments, the terminal 600 may optionally include a peripheral device interface 603 and at least one peripheral device. The processor 601, the memory 602 and the peripheral device interface 603 may be connected through a bus or a signal line. Each peripheral device may be connected with the peripheral device interface 603 through a bus, a signal line or a circuit board. Specifically, the peripheral device includes at least one of a radio-frequency circuit 604, a display screen 605, a camera 606, an audio-frequency circuit 607, a positioning component 608 and a power supply 609.

The peripheral device interface 603 may be configured to connect at least one peripheral device related to input/output (I/O) to the processor 601 and the memory 602. In some embodiments, the processor 601, the memory 602 and the peripheral device interface 603 are integrated on the same chip or circuit board. In some other embodiments, any one or two of the processor 601, the memory 602 and the peripheral device interface 603 may be implemented on a single chip or circuit board, and the embodiment will not be limited thereto.

The radio-frequency circuit 604 is configured to receive and transmit a radio frequency (RF) signal which is also known as an electromagnetic signal. The radio-frequency circuit 604 performs communication with a communication network and other communication devices through the electromagnetic signal. The radio-frequency circuit 604 converts an electric signal into the electromagnetic signal to be transmitted or converts the received electromagnetic signal into the electric signal. Optionally, the radio-frequency circuit 604 includes an antenna system, an RF transceiver, one or more amplifiers, a tuner, an oscillator, a digital signal processor, a coding and decoding chipset, a user identity module card and the like. The radio-frequency circuit 604 may perform communication with other terminals through at least one wireless communication protocol. The wireless communication protocol includes, but is not limited to a metropolitan area network, each-generation mobile communication network (2G, 3G, 4G and 5G), a wireless local area network and/or a wireless fidelity (WiFi) network. In some embodiments, the radio-frequency circuit 604 may further include a near field communication (NFC) related circuit, and the embodiment will not be limited thereto.

The display screen 605 is configured to display a user interface (UI). The UI may include a graph, a text, an icon, a video and any combinations thereof. When the display screen 605 is a touch display screen, the display screen 605 is further capable of acquiring a touch signal on the surface or above the surface of the display screen 605. The touch signal may be used as a control signal to be input to the processor 601 so as to be processed. In this way, the display screen 605 may be further configured to provide a virtual button and/or a virtual keyboard, which is also known as a soft button and/or a soft keyboard. In some embodiments, one display screen 605 may be provided and arranged on a front panel of the terminal 600. In some other embodiments, at least two display screens 605 may be provided and respectively arranged on different surfaces of the terminal 600 or designed to be folded. And in some another embodiments, the display screen 605 may be a flexible display screen and is arranged on a bent surface or folded surface of the terminal 600. Even, the display screen 605 may be arranged to be a non-rectangular irregular shape, i.e., a special-shaped screen. The display screen 605 may be made of a liquid crystal display (LCD), an organic light-emitting diode (OLED) and the like.

The camera component 606 is configured to capture an image or a video. Optionally, the camera component 606 includes a front camera and a rear camera. Generally, the front camera is arranged on the front panel of the terminal, and the rear camera is arranged on the back of the terminal. In some embodiments, at least two rear cameras are provided, and the rear camera is any one of a main camera, a depth-of-field camera, a wide-angle camera and a telephoto camera, so that the main camera and the depth-of-field camera are integrated to achieve a background delexicalization function, and the main camera and the wide-angle camera are integrated to achieve pan-shooting and virtual reality (VR) shooting functions or other integrated shooting functions. In some embodiments, the camera component 606 may further include a flashlight. The flashlight may be a single-color-temperature flashlight or a double-color-temperature flashlight. The double-color-temperature flashlight refers to a combination of a warm-light flashlight and a clod-light flashlight and may be used for light compensation under different color temperatures.

The audio circuit 607 may include a microphone and a speaker. The microphone is configured to acquire sound waves of a user and an environment and convert the sound waves into electric signals to be input to the processor 601 so as to be processed or input to the radio-frequency circuit 604 to realize voice communication. For the purpose of stereophonic sound acquisition or noise reduction, a plurality of microphones may be provided and respectively arranged on different parts of the terminal 600. The microphone may also be an array microphone or an omnidirectional acquisition microphone. The speaker is configured to convert the electric signals from the processor 601 or the radio-frequency circuit 604 into the sound waves. The speaker may be a traditional thin film speaker or a piezoelectric ceramic speaker. When the speaker is the piezoelectric ceramic speaker, the electric signals not only may be converted into sound waves heard by human beings, but also may be converted into sound waves not heard by the human beings so as to be used for ranging. In some embodiments, the audio circuit 607 may also include a headset jack.

The positioning component 608 is configured to locate the current geographic position of the terminal 600 so as to realize navigation or location based service (LBS). The positioning component 608 may be based on a global positioning system (GPS) of America, a BeiDou system of China, a Glonass system of Russia and a Galileo system of European union.

The power supply 609 is configured to supply power for the components in the terminal 600. The power supply 609 may be alternating current, direct current, a disposable battery or a rechargeable battery. When the power supply 609 includes the rechargeable battery, the rechargeable battery may support wired charging or wireless charging. The rechargeable battery may be further configured to support a fast charging technology.

In some embodiments, the terminal 600 further includes one or more sensors 610. The one or more sensors 610 include, but are not limited to an acceleration sensor 611, a gyroscope sensor 612, a pressure sensor 613, a fingerprint sensor 614, an optical sensor 615 and a proximity sensor 616.

The acceleration sensor 611 may detect accelerations on three coordinate axes of a coordinate system established by the terminal 600. For example, the acceleration sensor 611 may be configured to detect components of a gravitational acceleration on the three coordinate axes. The processor 601 may control the display screen 605 to display a user interface with a horizontal view or a longitudinal view according to a gravitational acceleration signal acquired by the acceleration sensor 611. The acceleration sensor 611 may be further configured to acquire movement data of a game or the user.

The gyroscope sensor 612 may detect an engine body direction and rotation angle of the terminal 600 and may be cooperated with the acceleration sensor 611 to acquire a 3D action of the user to the terminal 600. The processor 601 may achieve the following functions: action induction (for example, the UI is changed according to tilt operation of the user), image stabilization during shooting, game control and inertial navigation according to the data acquired by the gyroscope sensor 612.

The pressure sensor 613 may be arranged on a side frame of the terminal 600 and/or a lower layer of the display screen 605. When the pressure sensor 613 is arranged on the side frame of the terminal 600, a holding signal of the user for the terminal 600 may be detected, and the processor 601 performs left/right hand recognition or fast operation according to the holding signal acquired by the pressure sensor 613. When the pressure sensor 613 is arranged on the lower layer of the display screen 605, the processor 601 controls an operable control on the UI according to the pressure operation of the user for the display screen 605. The operable control includes at least one of a button control, a scroll bar control, an icon control and a menu control.

The fingerprint sensor 614 is configured to acquire a fingerprint of the user, the processor 601 recognizes the identity of the user according to the fingerprint acquired by the fingerprint sensor 614, or the fingerprint sensor 614 recognizes the identity of the user according to the acquired fingerprint. When the identity of the user is recognized to be a trusted identity, the processor 601 authorizes the user to execute relevant sensitive operations including screen unlocking, encrypted information viewing, software downloading, payment, setting alteration and the like. The fingerprint sensor 614 may be arranged on the front, back or side of the terminal 600. When the terminal 600 is provided with a physical button or manufacturer logo, the fingerprint sensor 614 may be integrated with the physical button or manufacturer logo.

The optical sensor 615 is configured to acquire ambient light intensity. In one embodiment, the processor 601 may control the display brightness of the display screen 605 according to the ambient light intensity acquired by the optical sensor 615. Specifically, when the ambient light intensity is relatively high, the display brightness of the display screen 605 is increased; and when the ambient light intensity is relatively low, the display brightness of the display screen 605 is adjusted to be lowered. In the other embodiment, the processor 601 may further dynamically adjust shooting parameters of the camera component 606 according to the ambient light intensity acquired by the optical sensor 615.

The proximity sensor 616 is also known as a range sensor and is generally arranged on the front panel of the terminal 600. The proximity sensor 616 is configured to acquire a distance from the user to the front of the terminal 600. In one embodiment, when the proximity sensor 616 detects that the distance from the user to the front of the terminal 600 is gradually shortened, the processor 601 controls the display screen 605 to switch from an on-screen state to an off-screen state; and when the proximity sensor 616 detects that the distance from the user to the front of the terminal 600 is gradually increased, the processor 601 controls the display screen 605 to switch from the off-screen state to the on-screen state.

It can be understood by the skilled in the art that the structure as shown in FIG. 6 does not construct a limitation to the terminal 600 and the terminal may include more or less components than those shown in the figure, or be combined with some components or be arranged by adopting different components.

This application provides a computer program, and a processor or computer may execute each of corresponding steps and/or processes in the embodiments of the above method when the computer program is executed by the computer.

The above embodiments may be wholly or partially implemented by using software, hardware, firmware or any combinations thereof. When being implemented by using the software, the above embodiments may be wholly or partially implemented in a form of a computer program product. The computer program product includes one or more computer instructions. When the instructions of the computer program are loaded and executed on the computer, the processes or functions according to this application are wholly or partially generated. The computer may be a general-purpose computer, a special-purpose computer, a computer network or any other programmable apparatus. The computer instruction may be stored in a computer readable storage medium or be transmitted from one computer readable storage medium to the other computer readable storage medium, for example, the computer instruction may be transmitted from one website, computer, server or data center to the other website, computer, computer, server or data center in a wired (such as a coaxial cable, an optical fiber and a digital subscriber line) or wireless (such as infrared, wireless and microwave) way.

The computer readable storage medium may be any available medium which may be accessed by the computer or a data storage device including a server integrated by one or more available medium, a data center and the like. The available medium may be a magnetic medium (such as a diskette, a hard disk and a magnetic tape), an optical medium (such as a DVD) or a semiconductor medium (such as a solid state disk) and the like.

Other implementation solutions will be readily envisioned by those skilled in the art after considering the specification and putting the disclosure disclosed herein into practice. This application aims at covering any variations, purposes or adaptive changes itself, and these variations, purposes or adaptive changes conform to a general principle of this application and include common general knowledge or conventional technical means in the undisclosed technical field of the present disclosure. The specification and the embodiments are merely regarded to be exemplary, and the true scope and spirit of this application are appointed by the following claims.

It should be understood that this application is not limited to precise structures which have been described above and shown in the accompanying drawings, and various modifications and variations may be made without departing from the scope thereof. The scope of this application is merely limited by the appended claims.

What is claimed is:

1. A method for recognizing an image, comprising:
obtaining labeling results of training data to be labeled in a target training data set;
determining a weight coefficient of each labeling result in response to that the training data comprises a plurality of labeling results;
determining a label of the training data based on labeling result and the weight coefficient corresponding to the labeling result, wherein the training data with the label is the target training data for training a recognition model; and
recognizing the image based on the recognition model trained based on the target training data;
wherein said obtaining the labeling results of the training data to be labeled in the target training data set comprises:
obtaining initial labeling results of the training data to be labeled in the target training data set;
determining whether the initial labeling results satisfy a labeling condition; and
determining the labeling results in response to that the initial labeling result satisfies the labeling condition.

2. The method according to claim 1, wherein said determining the weight coefficient of each labeling result comprises:
obtaining occurrence times of each labeling result and all the labeling results respectively; and
determining the weight coefficient based on a ratio of the occurrence times of each labeling result to the occurrence times of all the labeling results.

3. The method according to claim 1, further comprises:
determining a loss function of the recognition model, wherein the loss function is configured to determine a convergence degree of the recognition model trained based on the target training data.

4. The method according to claim 3, wherein the loss function comprises relative entropy function; the loss of the loss function is determined based on the target training data, a prediction probability of that the recognition model recognize the target training data as a recognition result and the weight coefficient of the labeling result.

5. An apparatus for recognizing an image, comprising:
a processor; and
a memory configured to store an instruction executable by the processor; wherein the processor is configured to execute the instruction to:
obtain labeling results of training data to be labeled in a target training data set;
determine a weight coefficient of each labeling result in response to that the training data comprises a plurality of labeling results;
determine a label of the training data based on labeling result and the weight coefficient corresponding to the labeling result, wherein the training data with the label is the target training data for training a recognition model; and
recognize the image based on the recognition model trained based on the target training data;
wherein the processor is configured to obtain initial labeling results of the training data to be labeled in the target training data set, determine whether the initial labeling results satisfy a labeling condition; and determine the labeling results in response to that the initial labeling result satisfies the labeling condition.

6. The apparatus according to claim 5, wherein the processor is configured to obtain occurrence times of each labeling result and occurrence times of all labeling results respectively; and determine the weight coefficient based on a ratio of the occurrence times of each labeling result to the occurrence times of all labeling results.

7. The apparatus according to claim 5, wherein the processor is further configured to determine a loss function of the recognition model, wherein the loss function is configured to determine a convergence degree of the recognition model trained based on the target training data.

8. The apparatus according to claim 7, wherein the loss function comprises relative entropy function; the loss of the loss function is determined based on the training data, a prediction probability of that the recognition model recognize the target training data as a recognition result and the weight coefficient of the labeling result.

9. A non-transitory storage medium storing instruction that, when executed by a processor of an electronic device, cause the electronic device to perform the operation of:
obtaining labeling results of training data to be labeled in a target training data set; determining a weight coefficient of each labeling result in response to that the training data comprises a plurality of labeling results; determining a label of the training data based on labeling result and the weight coefficient corresponding to the labeling result, wherein the training data with the label is the target training data for training a recognition model; and recognizing the image based on the recognition model trained based on the target training data; wherein said obtaining the labeling results of the training data to be labeled in the target training data set comprises: obtaining initial labeling results of the training data to be labeled in the target training data set; determining whether the initial labeling results satisfy a labeling condition; and determining the labeling results in response to that the initial labeling result satisfies the labeling condition.

10. The storage medium according to claim 9, wherein said determining the weight coefficient of each labeling result comprises:
obtaining occurrence times of each labeling result and all the labeling results respectively; and
determining the weight coefficient based on a ratio of the occurrence times of each labeling result to the occurrence times of all the labeling results.

11. The storage medium according to claim 9, wherein the instruction that, when executed by a processor of the electronic device, cause the electronic device further to perform the operation of:
determining a loss function of the recognition model, wherein the loss function is configured to determine a convergence degree of the recognition model trained based on the target training data.

12. The storage medium according to claim 11, wherein the loss function comprises relative entropy function; the loss of the loss function is determined based on the target training data, a prediction probability of that the recognition model recognize the target training data as a recognition result and the weight coefficient of the labeling result.

* * * * *